Dec. 19, 1950  R. J. SCHNEEBERGER  2,534,928
INVERTED TETRODE VACUUM TUBE VOLTMETER
Filed April 28, 1948

WITNESSES:
E. A. M'Closkey
Ross Rogers Jr.

INVENTOR
Robert J. Schneeberger.
BY
Hyman Diamond
ATTORNEY

Patented Dec. 19, 1950

2,534,928

UNITED STATES PATENT OFFICE 2,534,928

INVERTED TETRODE VACUUM TUBE VOLTMETER

Robert J. Schneeberger, Pittsburgh, Pa., assignor to Westinghouse Electric Corporation, East Pittsburgh, Pa., a corporation of Pennsylvania Application April 28, 1948, Serial No. 23,725

6 Claims. (Cl. 171—95)

My invention relates to an electrical measuring device, and particularly to an electronic voltmeter.

In prior art voltmeters of which I am aware the voltage to be measured is impressed between the cathode and plate of a triode, the cathode being maintained positive and the anode negative. Depending on the transconductance of the triode, the grid current varied with the impressed plate voltage. Ordinarily this variation is not linear. A meter is provided for measuring the grid current that flows when the plate voltage is impressed. By indicating the magnitude of the grid current the meter indicates the magnitude of the plate voltage.

Such a voltmeter can measure voltages of the order of only a few kilovolts. This condition arises because at high plate voltages, exceeding a few kilovolts, a saturation effect occurs; the high negative field of the plate reduces the grid current substantially to zero. For voltages exceeding this grid current cut-off voltage, therefore, a change in plate voltage produces no further change in grid current.

The negative plate voltage at which grid current cut-off occurs can be raised somewhat by increasing the positive voltage of the grid. At substantial positive grid voltage, the grid current is so high as to damage the tube when the plate-cathode voltage is low. This expedient accordingly shifts the range of the voltmeter to higher upper and lower limits but does not extend it.

In some prior art voltmeters of which I am aware, for example those shown in Crew Patent 1,938,136, a tetrode electronic tube is included in lieu of the triode. In such voltmeters the negative terminal of the voltage to be measured is also connected to the plate and the positive terminal is connected to the cathode. The screen grid is maintained slightly positive and the control grid more positive with respect to the cathode. Control grid current is measured as an indication of voltage. Fig. 3 of the Crew patent shows that stationary points occur in the graph of grid current vs. plate potential of such a voltmeter. According to this graph, there are values of grid current which correspond to as many as three different voltages. The useful range of this voltmeter extends from —200 volts to —500 volts. Presumably, if a larger tube is employed in an effort to enable the voltmeter to measure high potentials, the stationary points would appear at correspondingly higher values of plate potential. The ambiguity of readings at these stationary points causes the Crew voltmeter to be useless at plate-cathode voltages near zero. As Crew explains the operation of his device depends on secondary emission from the screen grids and the stationary points arise from this secondary emission.

It is, accordingly, an object of my invention to provide an electronic voltmeter which shall have an extensive range.

Another object of my invention is to provide an electronic circuit arrangement which shall be capable of measuring high electrical potentials.

A further object of my invention is to provide a circuit arrangement employing a four electrode electron discharge device which shall be capable of measuring, by means of an indicating meter connected in one of its grid circuits, high electrical potentials applied to the plate circuit.

More specifically, it is an object of my invention to provide a novel electronic voltmeter which is capable of measuring voltages over a range from zero to —30 kilovolts.

My invention arises in part from the discovery that a satisfactory wide range electronic voltmeter can be produced without relying on secondary emission and that secondary emission effects can be eliminated if the screen grid is at a lower potential than the cathode. Secondary emission from the control grid then is repelled back to itself.

Since the screen grid is at a lower potential than the cathode, primary emission from the cathode does not reach the screen grid and secondary electrons are not emitted from the screen grid.

According to my invention, I provide an electronic voltmeter, including a tetrode, in which the screen grid of the tetrode is connected to its cathode through a resistor through which the control grid current that measures the impressed voltage flows. This current flows from the cathode through this resistor so that the screen grid is negative relative to the cathode, and the screen grid becomes more negative with respect to the cathode as the grid current increases. A more negative screen grid tends to retard the flow of control grid current and thus to protect the tetrode from overload.

The novel features of my invention are set forth with more particularity in the accompanying claims. The invention itself, however, with respect to the details thereof, together with additional objects and advantages may be better understood from the following description of a specific embodiment with reference to the accompanying drawing, in which:

Figure 1:
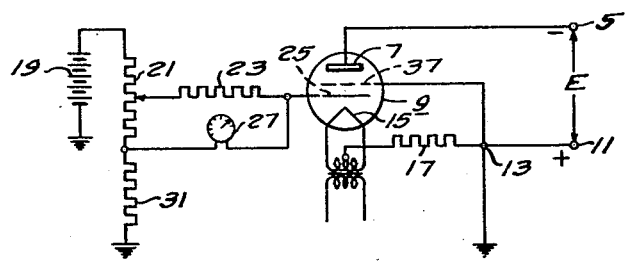
Figure 1 is a schematic circuit diagram of an electronic voltmeter embodying my invention.

In the apparatus shown in Fig. 1, a voltage E is to be measured. The negative terminal 5 of this voltage E is connected to the plate 7 of one tetrode discharge tube 9 and its positive terminal 11 of this is connected to ground 13. The cathode 15 of the tube is connected through a resistor 17 to ground 13. The screen grid 37 is connected directly to ground 13. A source of biasing voltage illustrated in Fig. 1 as a battery 19 is connected through a rheostat 21 and a second resistor 23 to the control grid 25. A milliammeter 27 and a portion of the rheostat 21 are connected in parallel with the second resistor 23. One side of the milliammeter 27 is connected through a resistor 31 to ground 13.

So that the voltmeter operates satisfactorily at low voltage, it is necessary to cause the grid current to remain as low as practicable. This object is effected by resistor 17 between the cathode 15 and ground 13, which gives degenerative feedback, decreasing the variation of grid current with change in anode voltage and improving the linearity of the grid current vs. plate voltage graph.

The rheostat 21 in the grid circuit provides a means whereby the milliammeter 27 in the grid circuit can be made to read zero or zero voltage, for the voltmeter can be described as a balanced bridge in which the voltage 19 is impressed between two of the four terminals in the bridge and the milliammeter connected between the other two terminals has a null reading. Further, the grid current is divided between the branch of the circuit into which the milliammeter 27 is connected and the branch in which the resistor 23 and the rheostat 21 are connected.

In this disclosure the word "ground" is defined as being a reference point for potential. It does not necessarily signify that the reference point is a conductor of large area; this point may be a simple wire or the terminal of a source.

Figure 2:
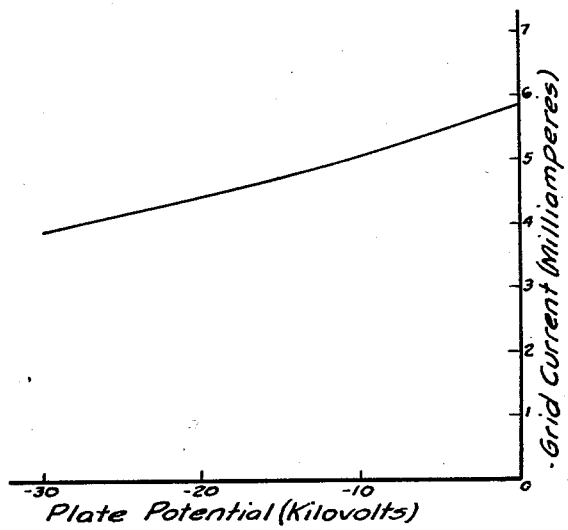
Fig. 2 is a graph of grid current as a function of plate potential for a voltmeter in accordance with my invention.

Grid current vs. plate potential curve of a voltmeter as taught in my invention is shown in Fig. 2. As shown in this graph the current through the milliammeter varies through a range of only two milliamperes while the plate potential varies from zero to 30 kilovolts. Further, this curve is substantially linear throughout this 30 kilovolt range and includes no stationary points. The linearity of the grid current vs. plate voltage curve and the small range over which the grid current varies contribute to the accuracy and versatility of this voltmeter.

Although I have shown and described a preferred embodiment of my invention, I realize that many modifications thereof are possible without departing from the spirit of the invention to the specific embodiment described.

I claim as my invention:

1. For use in measuring a potential impressed between a positive and a negative terminal, the combination comprising an electron tube having a cathode connected to said positive terminal, a plate connected to said negative terminal, a control grid, and a screen grid, voltage means to maintain the control grid positive with respect to the cathode, a meter in circuit with said control grid to measure control grid current, and connections for maintaining said screen grid at a potential negative with respect to said cathode.

2. For use in measuring a potential impressed between a negative terminal and ground, the combination comprising an electron tube having a cathode, a plate, a control grid, and screen grid, said negative terminal being connected to said plate and said screen grid being connected to ground, a source of voltage connected in circuit with said control grid and said cathode to maintain the control grid positive with respect to the ground, a meter in circuit with the said control grid to measure control grid current, and a resistor connected between said cathode and ground to provide degeneration in the control grid-cathode circuit.

3. The combination for measuring a potential, comprising a resistor, an electron tube having a cathode connected through said resistor to ground a plate, a control grid and a screen grid, said screen grid being connected to ground, said potential being impressed between said plate and ground in such a manner as to maintain said plate negative with respect to ground, voltage means connected between said control grid and ground to maintain said control grid positive with respect to ground, and a meter in circuit with said control grid to measure control grid current, a network of resistors connected to the meter so that said source of voltage and said resistors provide a bucking current which causes said meter to have a zero reading when no voltage is impressed between cathode and anode of the electron tube.

4. The combination for measuring a potential, comprising an electron tube having a cathode connected through a resistor to ground, a plate, a control grid, and a screen grid connected to ground, connections for impressing said potential between said plate and ground so that said plate is maintained negative with respect to ground, terminals for impressing voltage between said control grid and ground to maintain said control grid positive with respect to said cathode, a meter in circuit with said control grid to measure control grid current, a network of resistors connected to said meter so that said resistors divide the grid current so that only a portion of the grid current passes through said meter.

5. Apparatus for measuring voltages comprising an electron tube having a cathode, anode, screen grid and control grid, said voltage being impressed between the cathode and the anode of said electron tube to maintain said anode negative with respect to said cathode, said screen grid being maintained at a lower positive potential than said cathode and said control grid, and said control grid being maintained at a higher potential than said cathode.

6. The combination for measuring a potential, comprising an electron tube having a cathode, a plate, control grid and screen grid, connections for impressing said potential between the plate and the cathode to maintain the plate negative with respect to the cathode, terminals for impressing a voltage to maintain the control grid positive with respect to the cathode, a meter in circuit with said control grid to measure control grid current and resistor means connected in circuit with said control grid and said cathode and connections between said screen grid and said resistor means for maintaining said screen grid at a lower potential than the cathode by a magnitude dependent on grid positive current flow.

ROBERT J. SCHNEEBERGER.

REFERENCES CITED

The following references are of record in the file of this patent:

UNITED STATES PATENTS

| Number | Name | Date |
|---|---|---|
| 1,938,136 | Crew | Dec. 5, 1933 |

OTHER REFERENCES

"Fundamentals of Radio," by Jordan, Nelson, Osterbrock, Pumphrey, and Smeby; Editor Everitt; Prentice-Hall, Inc., N. Y., 1942, page 205, Figure 8-2.